(12) United States Patent
Reyes et al.

(10) Patent No.: US 10,805,502 B2
(45) Date of Patent: Oct. 13, 2020

(54) SYSTEM AND METHOD OF DISPLAYING WATERMARKS

(71) Applicant: Dell Products L.P., Round Rock, TX (US)

(72) Inventors: Luis Antonio Valencia Reyes, Zapopan (MX); Ricardo Antonio Ruiz, The Colony, TX (US); James Darrell Testerman, McKinney, TX (US); Dongli Wu, Allen, TX (US); Venkata Satya Narasimha Murthy Prayaga, Piscataway, NJ (US); Jonathan Nathan Yanez, Allen, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 16/017,616

(22) Filed: Jun. 25, 2018

(65) Prior Publication Data

US 2019/0394353 A1 Dec. 26, 2019

(51) Int. Cl.
| | | |
|---|---|---|
| *H04N 1/32* | (2006.01) | |
| *H04N 1/44* | (2006.01) | |
| *G06F 21/60* | (2013.01) | |
| *G06F 21/62* | (2013.01) | |
| *G06F 3/12* | (2006.01) | |

(52) U.S. Cl.
CPC ....... *H04N 1/32352* (2013.01); *G06F 3/1243* (2013.01); *G06F 21/608* (2013.01); *G06F 21/6209* (2013.01); *H04N 1/4486* (2013.01)

(58) Field of Classification Search
None
See application file for complete search history.

(56) References Cited

U.S. PATENT DOCUMENTS

| | | | | |
|---|---|---|---|---|
| 8,677,132 | B1 * | 3/2014 | Liao | H04L 9/0894 713/176 |
| 2007/0143603 | A1 * | 6/2007 | Hadden | G06F 21/608 713/167 |
| 2009/0128859 | A1 * | 5/2009 | Daos | H04N 1/32203 358/3.28 |
| 2010/0039663 | A1 * | 2/2010 | Ohsone | H04N 19/467 358/1.15 |
| 2013/0212432 | A1 * | 8/2013 | Guthrie | G06F 11/0709 714/16 |
| 2014/0032691 | A1 | 1/2014 | Barton | |

(Continued)

*Primary Examiner* — Miya J Williams
(74) *Attorney, Agent, or Firm* — Baker Botts L.L.P.

(57) ABSTRACT

In one or more embodiments, one or more systems, methods, and/or processes may redirect a request to open a document to a background process that controls access to the document; may determine policy information associated with the document and a user of an application; may provide the document to the application; may determine an area of a user interface of the application that displays information of the document; may determine watermark information based at least on the policy information; may generate one or more watermarks based at least on the watermark information; and may display the one or more watermarks, based at least on the watermark information, on the area of the user interface of the application that displays the information of the document.

20 Claims, 11 Drawing Sheets

(56) References Cited

U.S. PATENT DOCUMENTS

| | | | |
|---|---|---|---|
| 2014/0118766 A1* | 5/2014 | Kang | G06F 3/1207 358/1.13 |
| 2015/0143091 A1 | 5/2015 | Brace et al. | |
| 2015/0149749 A1 | 5/2015 | Brace et al. | |
| 2015/0154660 A1* | 6/2015 | Weald | G06Q 30/0277 705/14.73 |
| 2015/0163206 A1* | 6/2015 | McCarthy | G06F 21/6227 713/171 |
| 2016/0283406 A1* | 9/2016 | Linga | G06F 21/6218 |
| 2017/0004316 A1 | 1/2017 | Walton | |
| 2019/0065701 A1 | 2/2019 | Yadav | |
| 2019/0266279 A1* | 8/2019 | Aseev | G06F 16/215 |

\* cited by examiner

SYSTEM AND METHOD OF DISPLAYING WATERMARKS

BACKGROUND

Field of the Disclosure

This disclosure relates generally to information handling systems and more particularly to displaying watermarks on information displayed by information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may redirect a request to open a document to a background process that controls access to the document; may determine policy information associated with the document and a user of an application; may provide the document to the application; may determine an area of a user interface of the application that displays information of the document; may determine watermark information based at least on the policy information; may generate one or more watermarks based at least on the watermark information; and may display the one or more watermarks, based at least on the watermark information, on the area of the user interface of the application that displays information of the document. In one or more embodiments, the information of the document may include one or more of text, a graphic, a table, and another document, among others. In one or more embodiments, the watermark information may include one or more of an identification associated with an information handling system, an identification associated with the user, an identification associated with a company, and copyright information, among others. In one or more embodiments, the one or more systems, methods, and/or processes may further determine an area of a user interface of a print preview of the document and display at least one of the one or more watermarks, based at least on the watermark information, on the area of the user interface of the print preview of the document. In one or more embodiments, the one or more systems, methods, and/or processes may further: determine that the area of the user interface of the application that displays information of the document has been resized, determine a new size of the area of the user interface of the application that displays the information of the document, and display at least one of the one or more watermarks based at least on the new size of the area of the user interface of the application that displays the information of the document.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
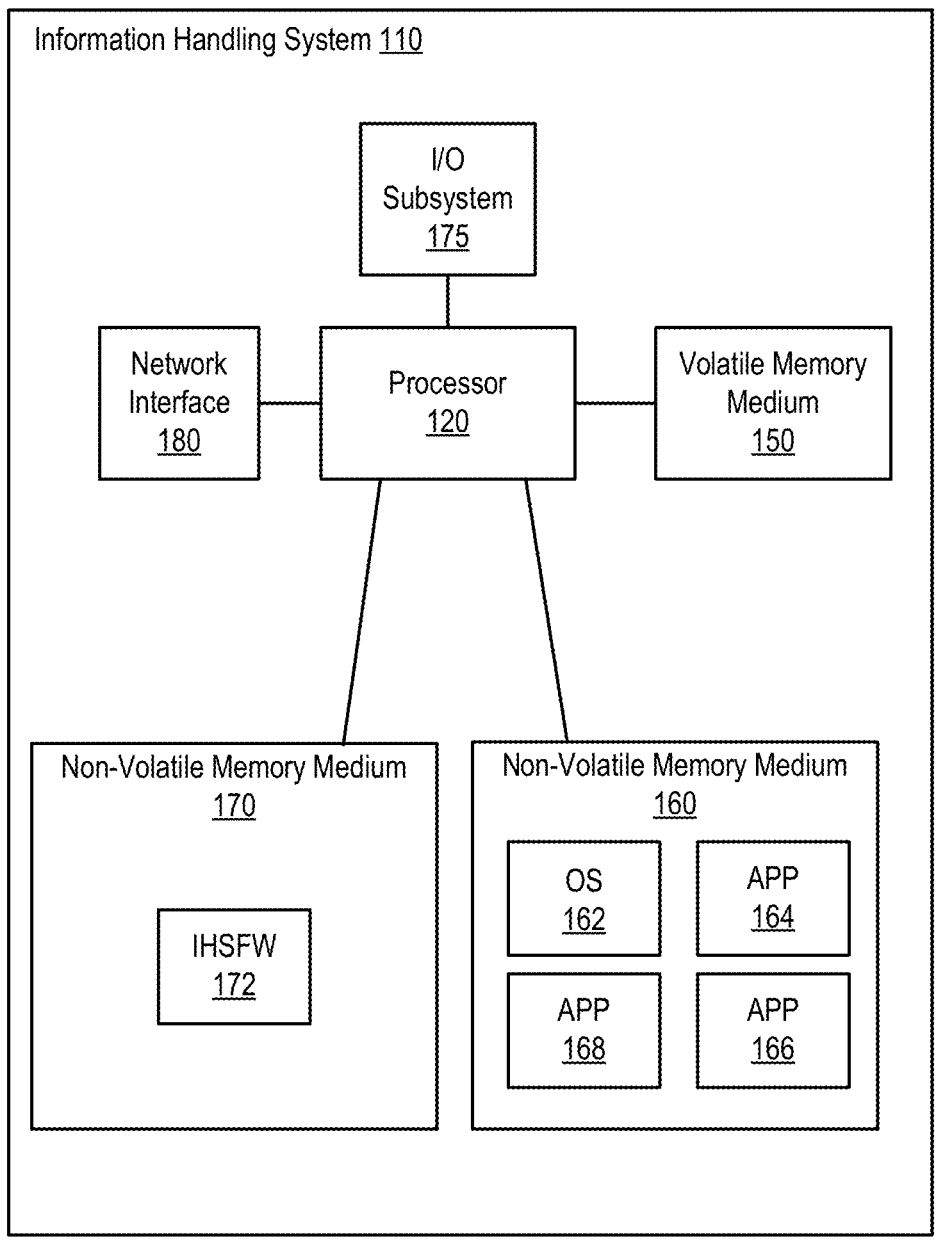
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an on-screen watermark may be displayed on a user interface of an application. For example, the application may be or include a third party application. In one or more embodiments, displaying an on-screen watermark on a user interface of an application may protect information being displayed the user interface of the application. For example, one or more of a screen shot and a photograph, among others, may include the watermark. In one or more embodiments, an on-screen watermark may be displayed on a user interface of an application to protect one or more of personal interests, business interests, and governmental interests, among others. In one or more embodiments, an on-screen watermark may be displayed on a user interface of an application based at least on a policy. In one example, the policy may be associated with a file. In one instance, the file may be or include a word processing document. In a second instance, the file may be or include a spreadsheet. In a third instance, the file may be or include a presentation file (e.g., a PowerPoint file). In another instance, the file may be or include a portable document format (PDF) file. In another example, the policy may be associated with a user. For instance, the policy may include one or more levels of user access associated with one or more files. In one or more embodiments, metadata of a file may include one or more policies associated with the file.

In one or more embodiments, an on-screen watermark may be displayed on a user interface of an application without involvement of a developer of the application. In one example, displaying the on-screen watermark on the user interface of the application may include injecting graphical information into a data stream associated with displaying the user interface. In a second example, displaying the on-screen watermark on the user interface of the application may include intercepting an application programming interface (API) call to display the user interface or a portion of the user interface. In another example, displaying the on-screen watermark on the user interface of the application may include displaying another user interface (e.g., a window) that includes the watermark on the user interface.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
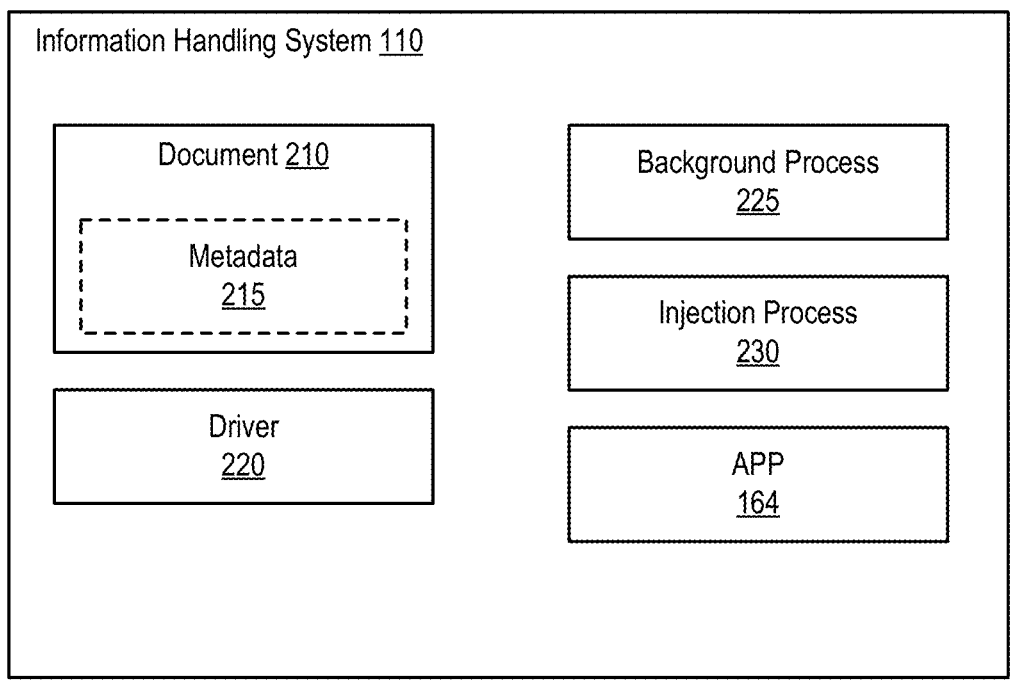
FIG. 2 illustrates examples of elements of an on-screen watermark system, according to one or more embodiments.

Turning now to FIG. 2, examples of elements of an on-screen watermark system are illustrated, according to one or more embodiments. In one or more embodiments, a document 210 may be selected to be opened. For example, a user may select an icon that is associated with document 210. For instance, the user may double click on the icon that is associated with document 210. In one or more embodiments, when document 210 is selected to be opened, a request to open document 210 may be generated. In one or more embodiments, document 210 may be or include a file. Although document 210 is illustrated as being included by IHS 110, document 210 may be included by another IHS 110, according to one or more embodiments. For example, document 210 may be accessed on the other IHS 110 via a network.

In one or more embodiments, a driver 220 may intercept the request to open document 210. In one or more embodiments, driver 220 may provide information associated with the request to open document 210 to a background process 225. For example, the information associated with the request to open document 210 may include one or more of a filename, a path to document 210, and an application associated with document 210. In one or more embodiments, background process 225 may be or include a Windows service of a Windows operating system. In one or more embodiments, background process 225 may be or include a daemon. For example, the daemon may be a background process of a Unix operating system or a Unix-like operating system.

In one or more embodiments, background process 225 may start an injection process 230 if injection process 230 has not been started. In one or more embodiments, background process 225 may provide policy information to injection process 230. For example, metadata 215 may include the policy information. As illustrated, document 210 may include metadata 215. In one or more embodiments, background process 225 may retrieve metadata 215 from document 210. For example, background process 225 may determine the policy information from metadata 215. For instance, background process 225 may provide the policy information, based at least on metadata 215, to injection process 230.

In one or more embodiments, injection process 230 may query background process 225. For example, the query may include a request for information that may be utilized in determining if document 210 includes data that should be protected. In one example, background process 225 may determine if document 210 includes data that should be protected based at least on metadata 215. In another example, background process 225 may determine if document 210 is encrypted. For instance, if document 210 is encrypted, then document 210 includes data that should be protected. In one or more embodiments, if document 210 includes data that should be protected, background process 225 may provide information to injection process 230 that indicates that document 210 includes data that should be protected.

In one or more embodiments, injection process 230 may receive the policy information from background process 225 and determine one or more attributes associated with the policy information. In one or more embodiments, injection process 230 may determine one or more attributes associated with one or more of IHS 110, a user of IHS 110, APP 164, a user interface of APP 164, and elements of the user interface of APP 164, among others. In one or more embodiments, injection process 230 may generate a watermark based at least on the one or more attributes associated with the policy information and/or the one or more attributes associated with one or more of IHS 110, the user of IHS 110, APP 164, the user interface of APP 164, and the elements of the user interface of APP 164, among others. In one or more embodiments, injection process 230 may display the watermark on at least a portion of the user interface of APP 164. As illustrated, IHS 110 may include document 210, metadata 215, driver 220, background process 225, injection process 230, and APP 164.

Figure 3A:
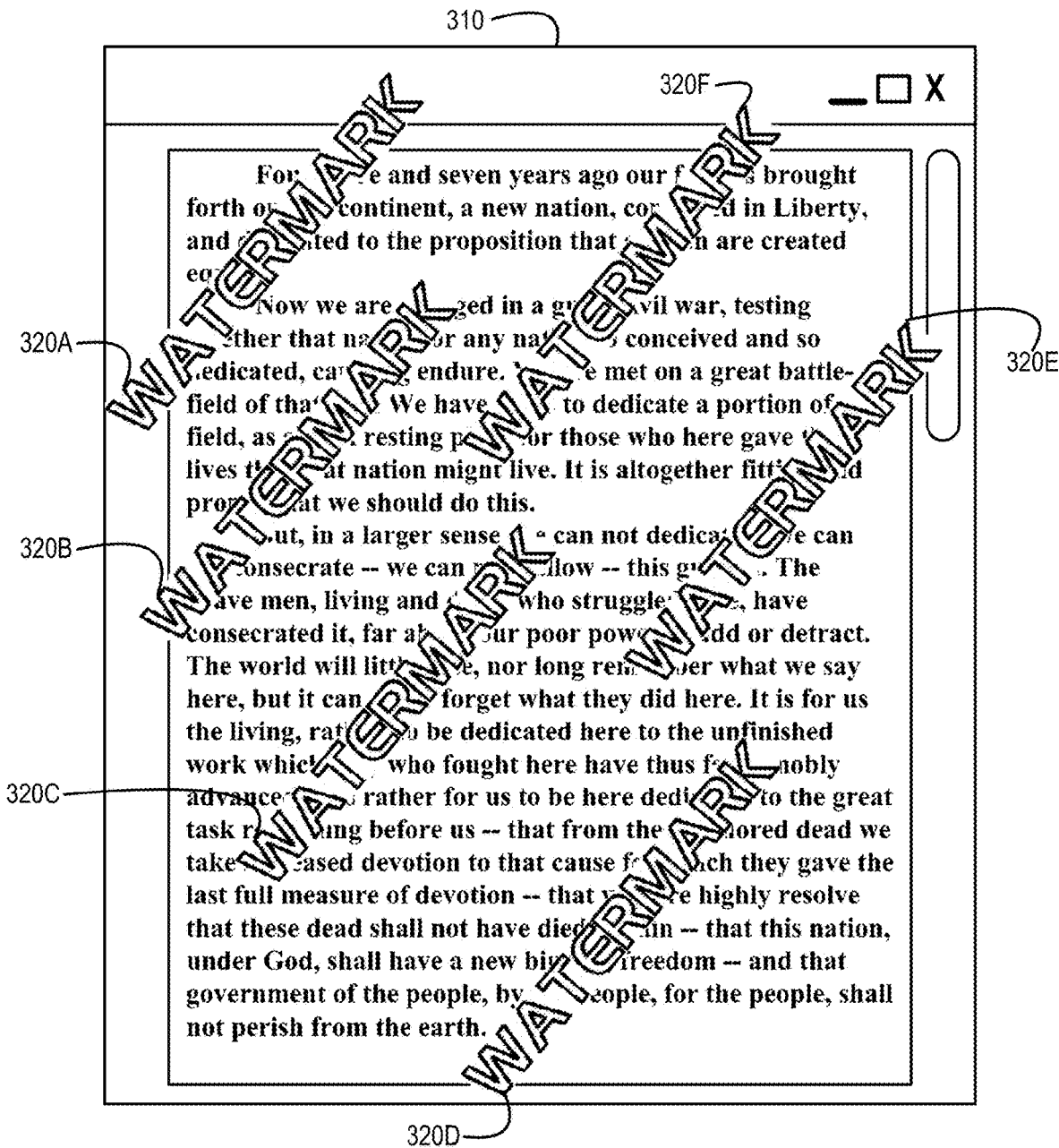
FIGS. 3A-3G illustrate examples of watermarks, according to one or more embodiments.
Figure 3B:
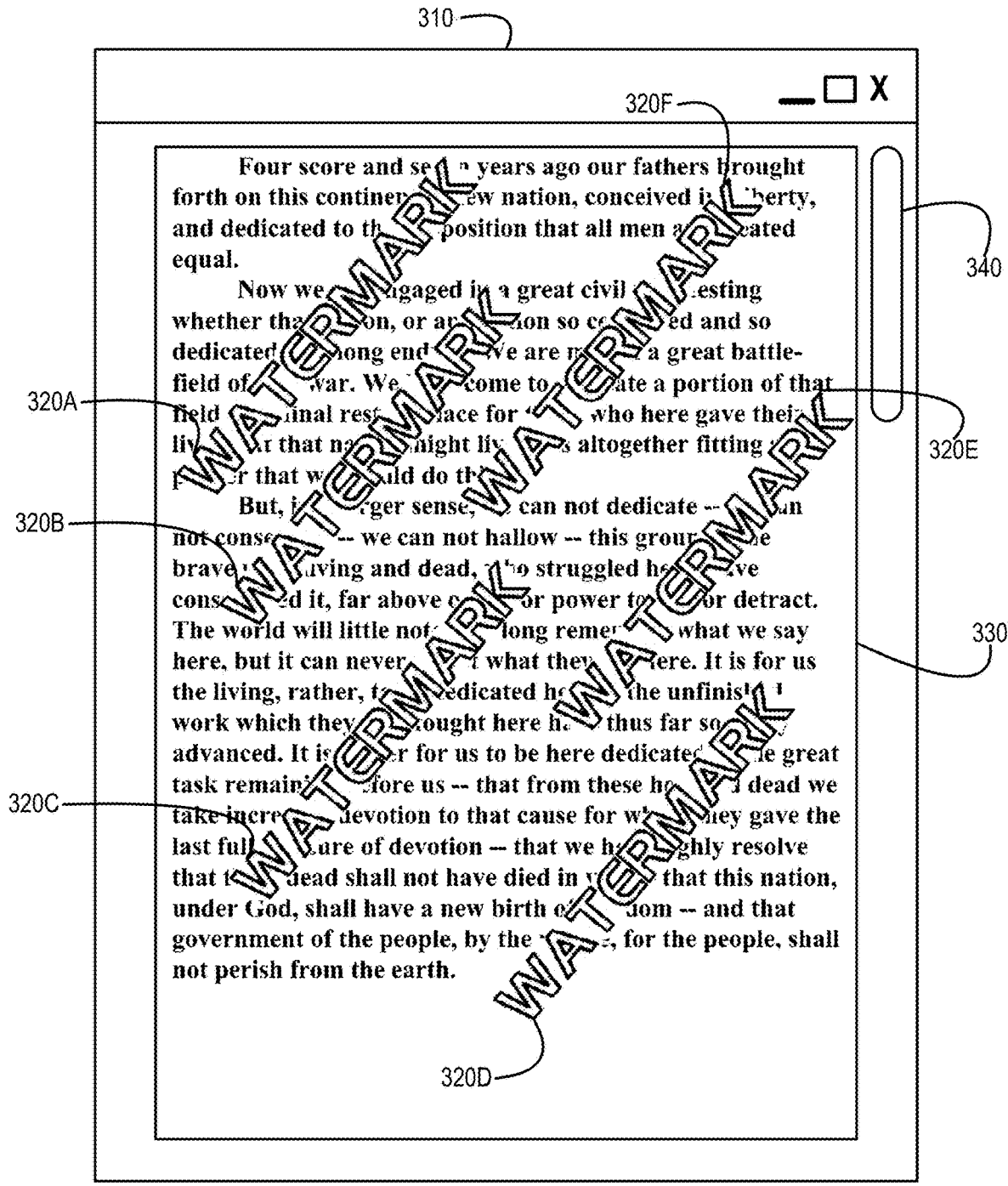

Turning now to FIGS. 3A-3G, examples of watermarks are illustrated, according to one or more embodiments. As shown in FIG. 3A, a user interface 310 may display information. For example, user interface 310 may be a user interface of APP 164. For instance, interface 310 may display information of document 210. As illustrated, watermarks 320A-320F may be displayed on user interface 310. As shown in FIG. 3B, watermarks 320A-320F may be displayed on user interface 310, where user interface 310 may display information of document 210. For example, user interface element 330 of user interface 310 may display information of document 210. For instance, a watermark 320 may not be displayed on a scroll bar element 340 of user interface 310.

Figure 3C:
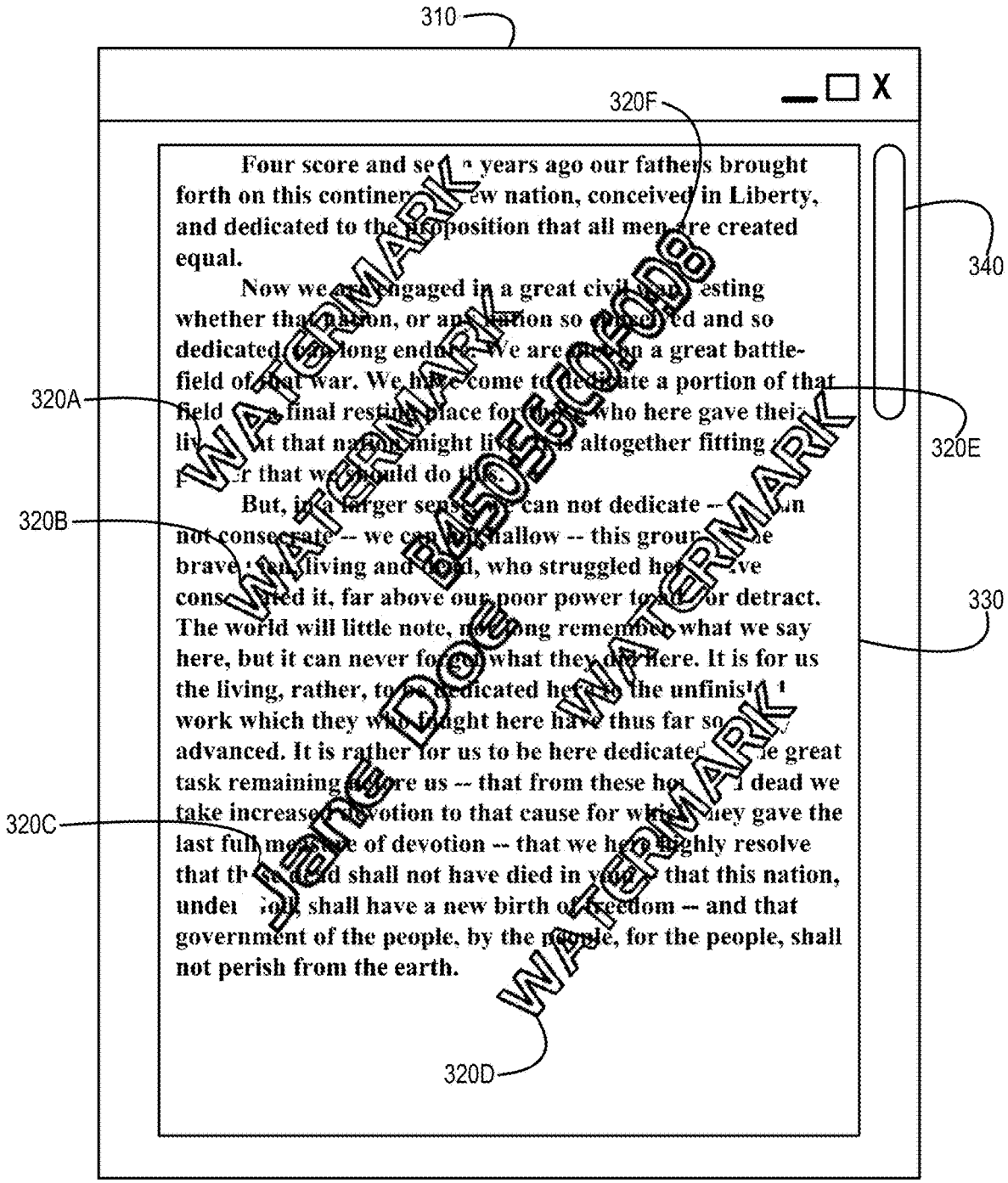

In one or more embodiments, watermark 320 may display other information. For example, a watermark may display "Confidential", "Privileged", "Private", "Secret", "Top Secret", etc. In one or more embodiments, watermark 320 may display information associated with one or more attributes associated with one or more of IHS 110, a user of IHS 110, APP 164, a user interface of APP 164, and elements of the user interface of APP 164, among others. As shown in FIG. 3C, watermark 320C may display a name of a user. As illustrated, watermark 320F may display an identification associated with IHS 110. For example, watermark 320F may or include a media access control (MAC) address associated with IHS 110.

Figure 3D:
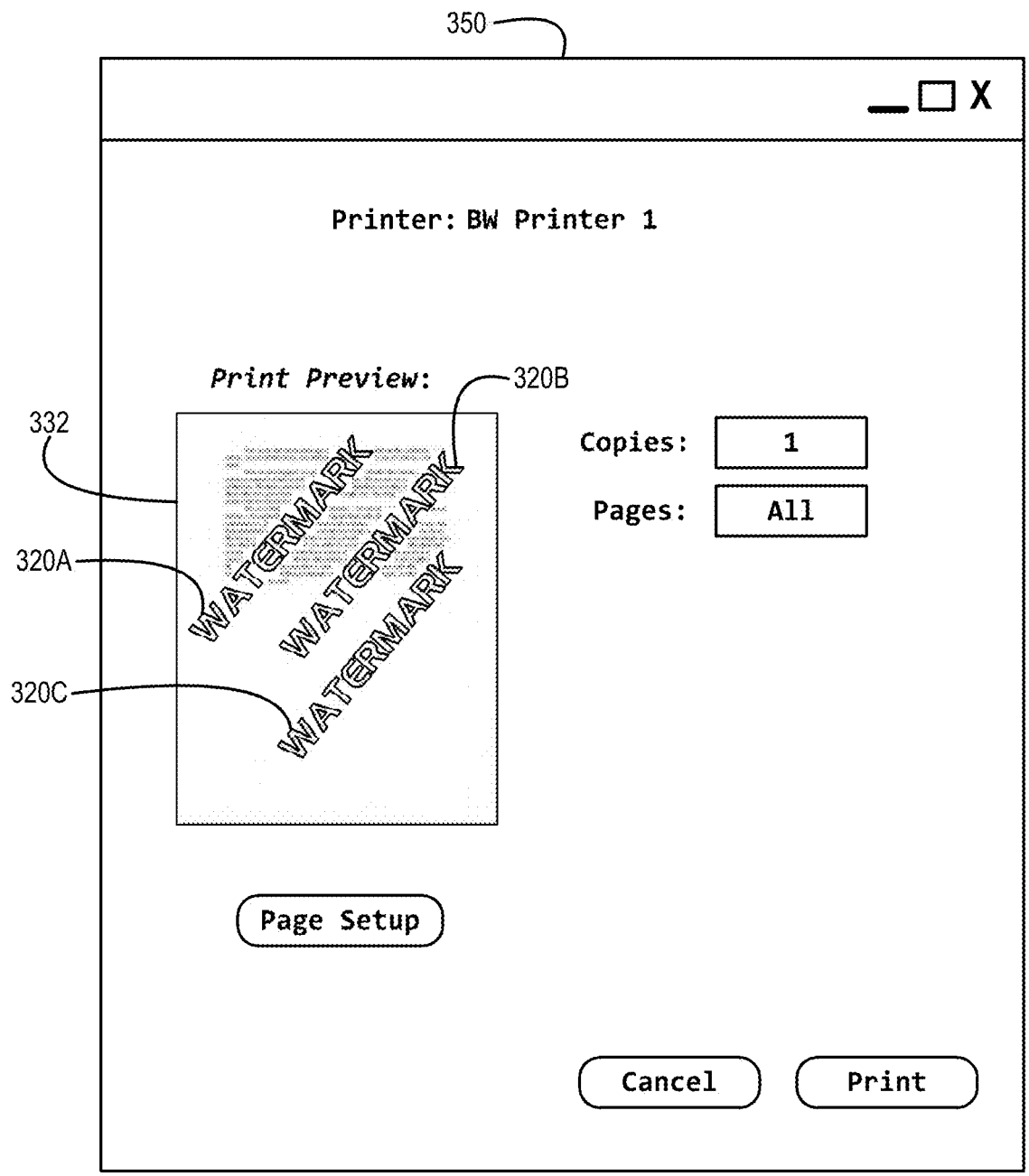

In one or more embodiments, a user interface 350 of or associated with APP 164 may display watermarks on information of document 210. As shown in FIG. 3D, user interface 350 may be or include a printing dialogue interface. As illustrated, watermarks 320A-320C may be displayed on information of document 210, displayed via user interface 350.

Figure 3E:
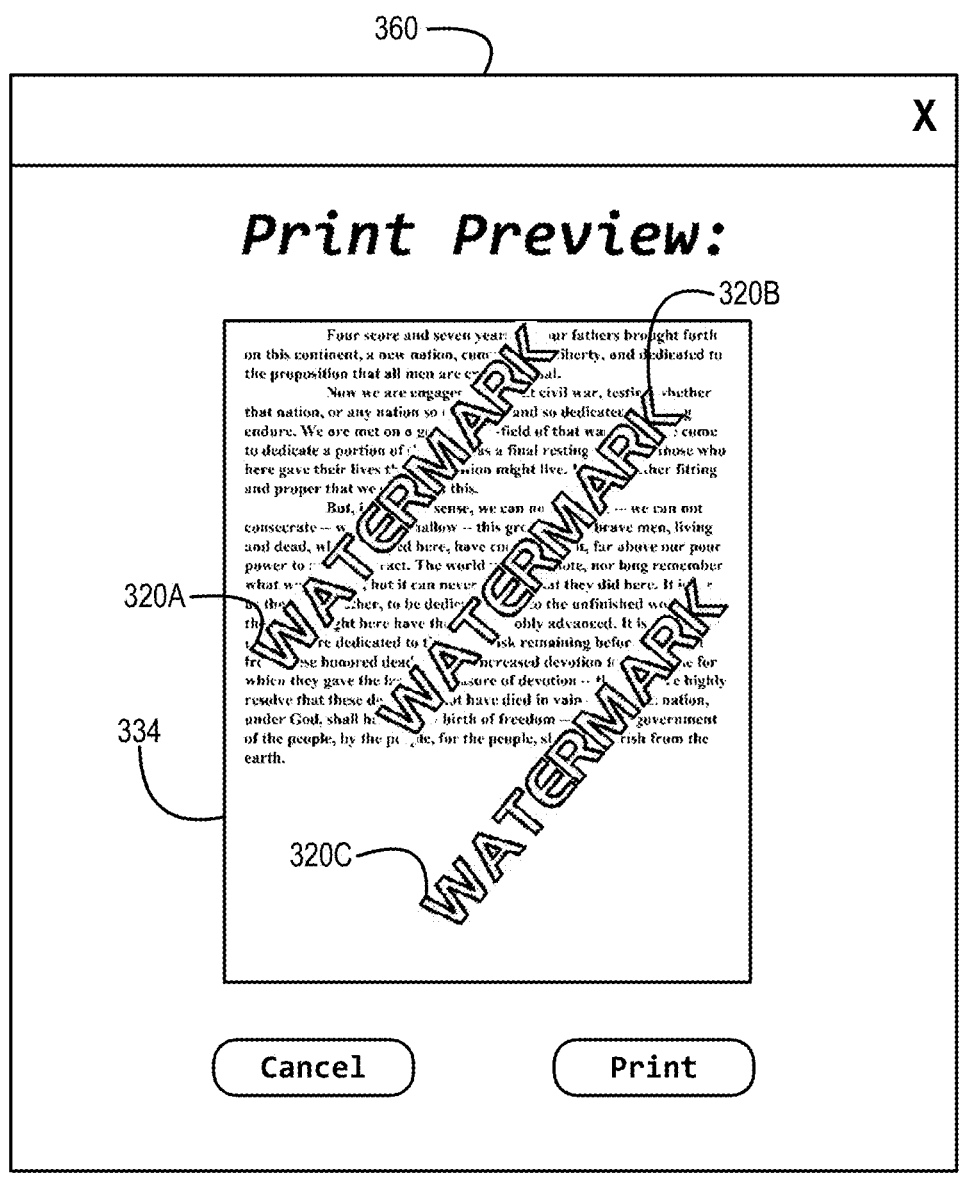
Figure 3F:
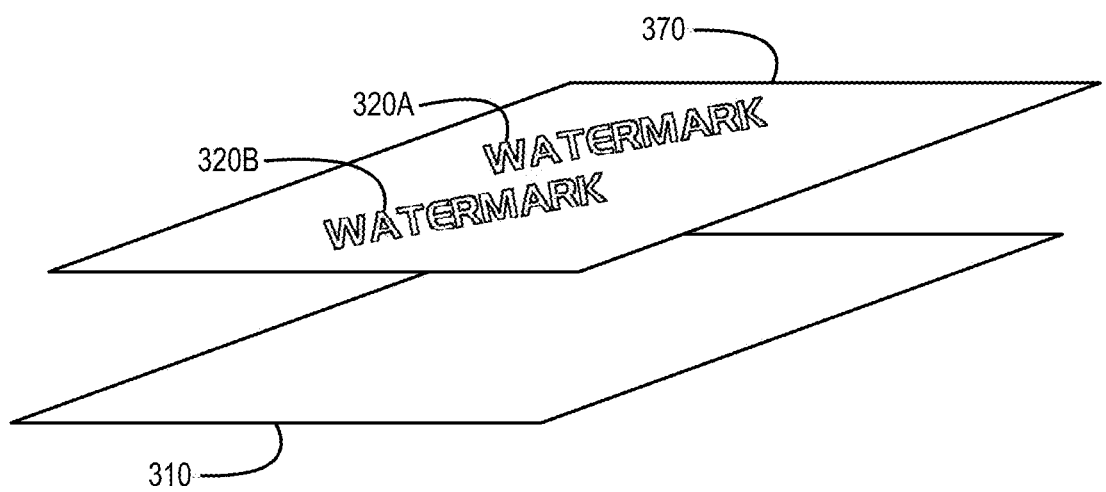

As shown in FIG. 3E, a user interface 360 may be or include a print preview interface. As illustrated, watermarks 320A-320C may be displayed on information of document 210, displayed via user interface 360. In one or more embodiments, a second user interface may be displayed on a first user interface. As shown in FIG. 3F, a user interface 370 may be displayed on user interface 310. As illustrated, user interface 370 may display watermarks 320A and 320B. In one or more embodiments, user interface 370 may be or include a window.

Figure 3G:
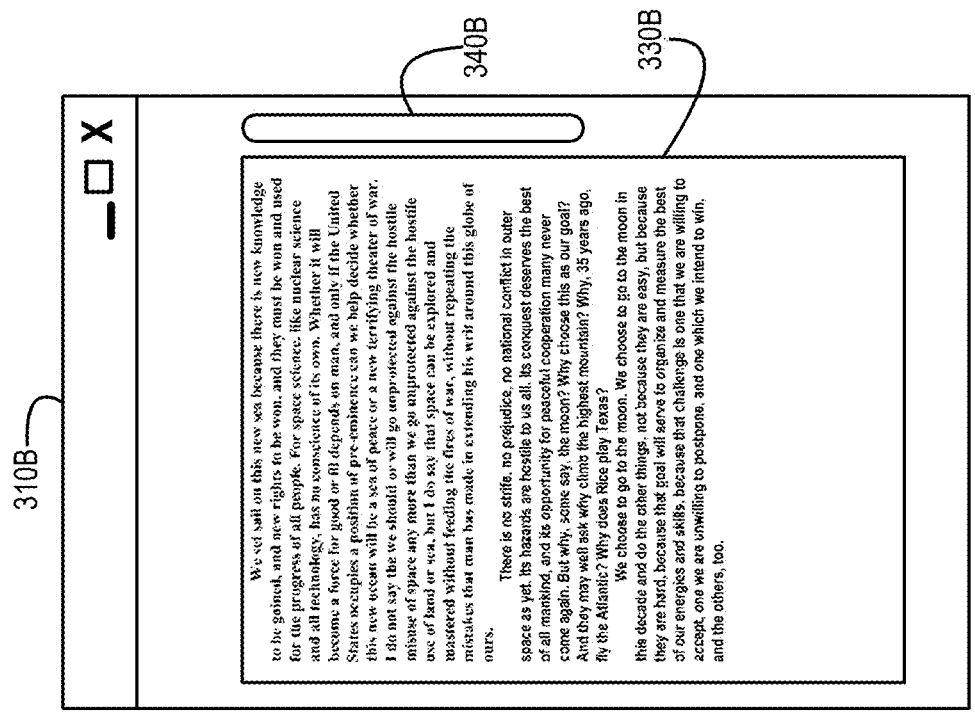
Figure 3G:
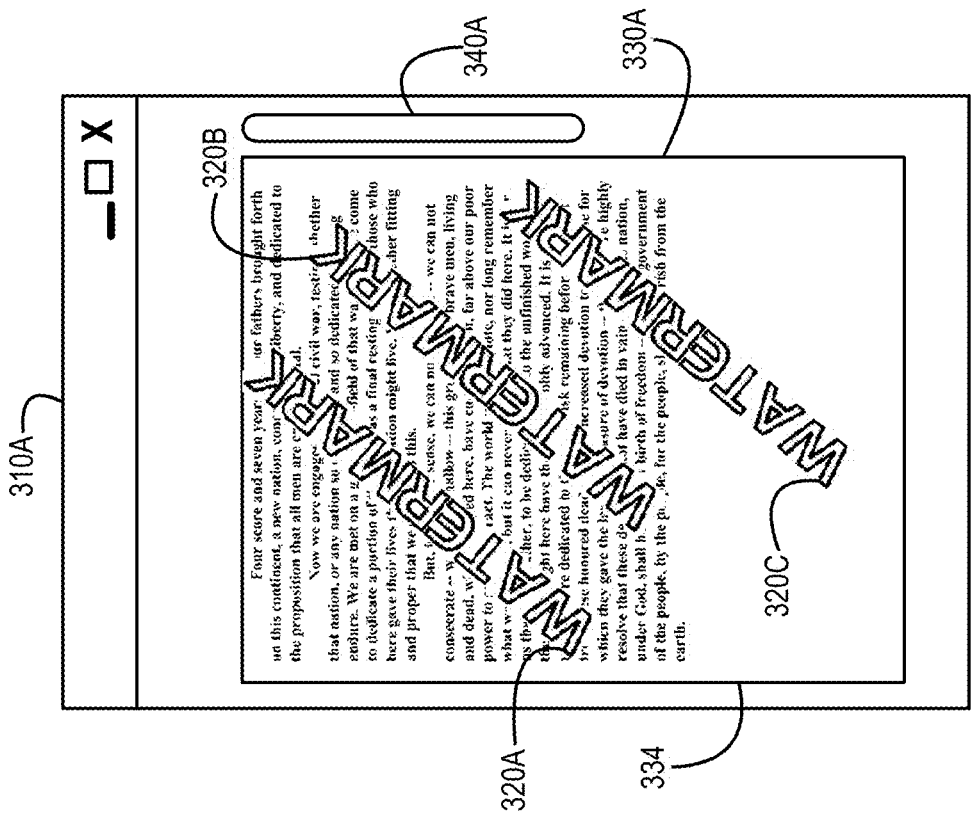

As shown in FIG. 3G, watermarks 220A-220C may be displayed information displayed via display area 330A, and information may be displayed via a display area 330B of a user interface 310B without watermarks. In one example, user interface 310B may be a user interface of APP 164. In one instance, information displayed via display area 330A and information displayed via display area 330B may be of the same document. In another instance, information displayed via display area 330A and information displayed via display area 330B may be of different documents. In another example, user interface 310B may be a user interface of APP 166. In one instance, information displayed via display area 330A and information displayed via display area 330B may be of the same document. In another instance, information displayed via display area 330A and information displayed via display area 330B may be of different documents.

Figure 4:
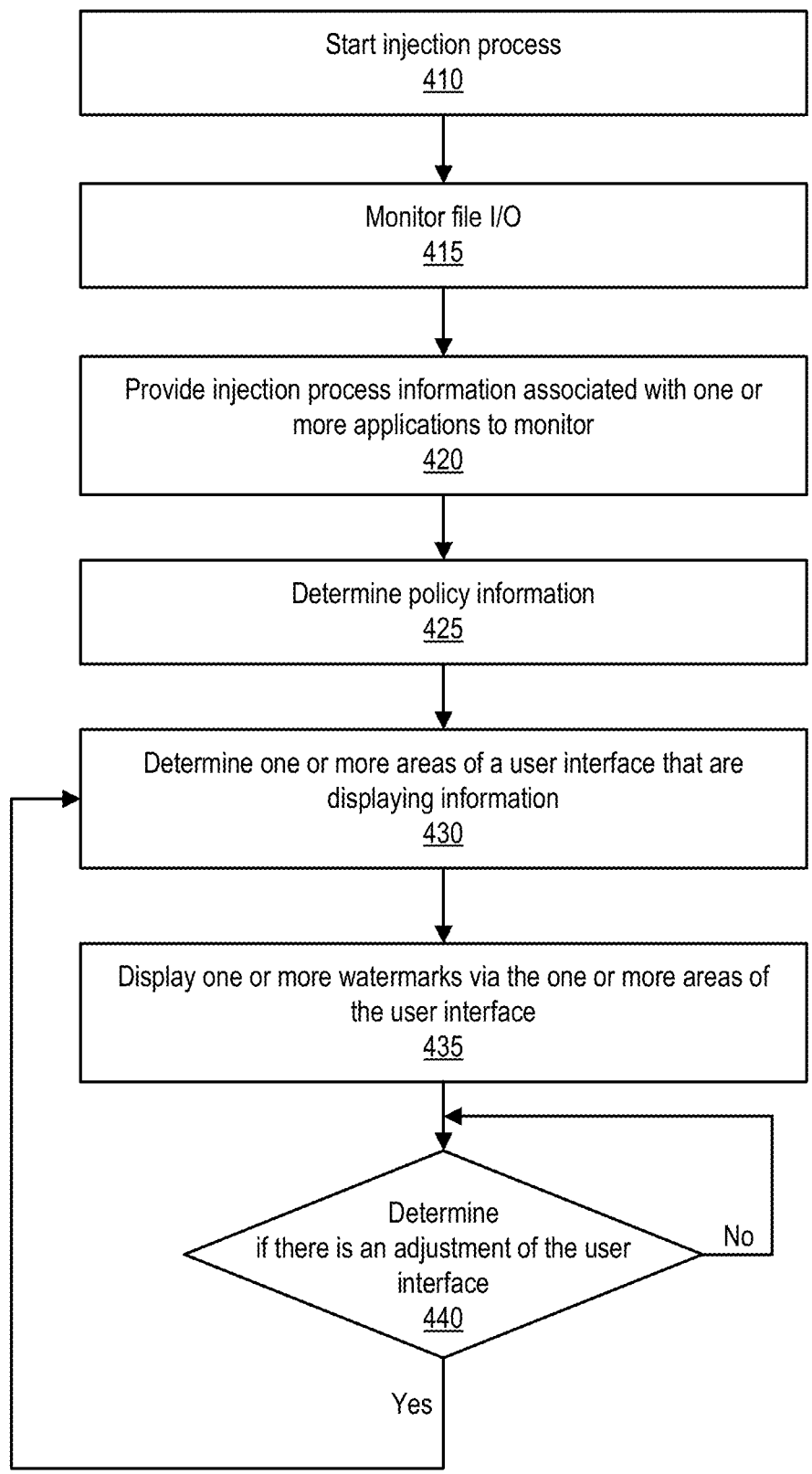
FIG. 4 illustrates an example of a method of displaying one or more watermarks, according to one or more embodiments.

Turning now to FIG. 4, an example of a method of displaying one or more watermarks is illustrated, according to one or more embodiments. At 410, an injection process may be started. For example, injection process 230 may be started. In one or more embodiments, the injection process may be started upon a start of a user session. For example, the injection process may be started when the user logs into OS 162 and/or IHS 110. At 415, file I/O may be monitored. For example, background process 225 may monitor file I/O. In one or more embodiments, background process 225 may monitor file I/O via driver 220.

At 420, the injection process may be provided with information associated with one or more applications to monitor. In one example, as background process 225 is monitoring file I/O, background process 225 may determine that a request to open a word processing document has been issued. For instance, background process 225 may provide information associated with a word processing application to injection process 230, and injection process 230 may monitor the word processing application. In a second example, background process 225 may determine that a request to open a spreadsheet document has been issued. For instance, background process 225 may provide information associated with a spreadsheet application to injection process 230, and injection process 230 may monitor the spreadsheet application. In a third example, background process 225 may determine that a request to open a PDF document has been issued. For instance, background process 225 may provide information associated with a PDF application to injection process 230, and injection process 230 may monitor the PDF application. In another example, background process 225 may determine that a request to open a presentation document has been issued. For instance, background process 225 may provide information associated with a presentation application to injection process 230, and injection process 230 may monitor the presentation application.

At 425, policy information may be determined. For example, background process 225 may determine the policy information. In one or more embodiments, the policy information may be determined from one or more of the document and an identification associated with a user, among others. In one example, the policy information may be determined from metadata of the document. For instance, the policy information may be determined from metadata 215 of document 210. In another example, the policy information may be determined from a username associated with a user of the application.

At 430, one or more areas of a user interface associated that are displaying information may be determined. In one example, it may be determined that display area 330 of user interface 310 is displaying information of document 210. In a second example, it may be determined that a display area 332 of user interface 350 is displaying information of document 210. In another example, it may be determined that a display area 334 of user interface 360 is displaying information of document 210.

At 435, one or more watermarks may be displayed via the one or more areas of the user interface associated that are displaying information of document 210. For example, injection process 230 may display one or more watermarks via the one or more areas of the user interface associated that are displaying information of document 210. In one or more embodiments, injection process 230 may generate the one or more watermarks based on information received from background process 225. For example, injection process 230 may receive the policy information from background process 225.

At 440, it may be determined if there is an adjustment of the user interface. If there is not an adjustment of the user interface, the method may repeat 440, according to one or more embodiments. If there is an adjustment of the user interface, the method may proceed to 430, according to one or more embodiments. In one or more embodiments, a user interface adjustment may be or include changing user interfaces. For example, a user interface adjustment may be or include changing form user interface 310 to user interface 350. In one or more embodiments, a user interface adjustment may be or include changing a size of the user interface. In one example, user interface 310 may be increased in size. In one instance, one or more of watermarks 320A-320F may be moved to compensate for a size increase of user interface 310. In another instance, additional watermarks 320 may be displayed to compensate for a size increase of user interface 310. In another example, user interface 310 may be decreased in size. In one instance, one or more of watermarks 320A-320F may be moved to compensate for a size decrease of user interface 310. In another instance, one or more of watermarks 320A-320F may not be display to compensate for a size decrease of user interface 310.

Figure 5:
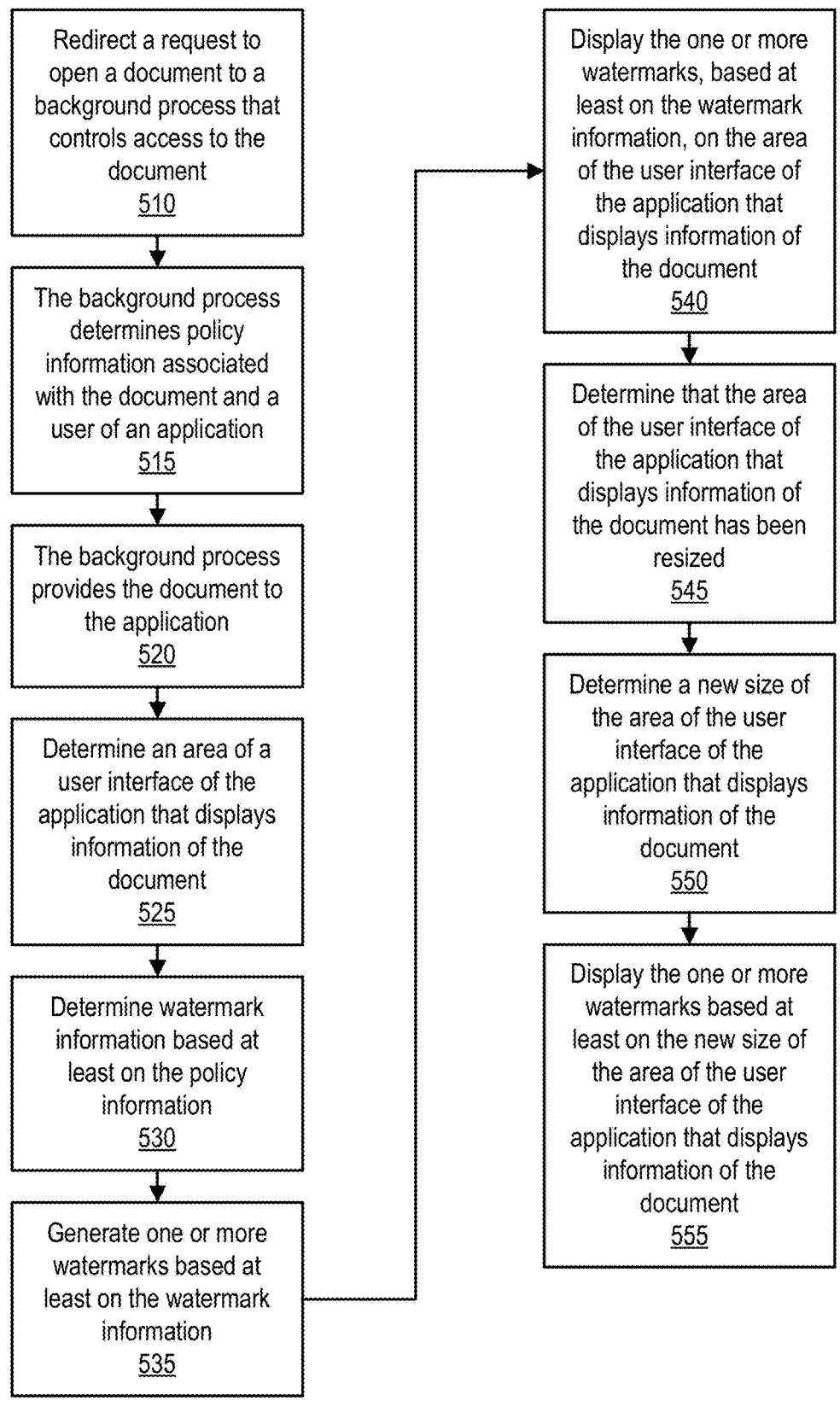
FIG. 5 illustrates an example of another method of displaying one or more watermarks, according to one or more embodiments.

Turning now to FIG. 5, an example of another method of displaying one or more watermarks is illustrated, according to one or more embodiments. At 510, a request to open a document may be redirected to a background process that controls access to the document. For example, a request to open document 210 may be redirected to background process 225. For instance, a filter driver may redirect a request to open document 210 to background process 225.

At 515, the background process may determine policy information associated with the document and a user of an application. For example, background process 225 may determine policy information associated with the document and a user of an application, among others. For instance, background process 225 may utilize metadata 215 in determining policy information associated with document 210.

At 520, the background process may provide the document to the application. For example, background process 225 may provide document 210 to APP 164. In one or more embodiments, background process 225 may be utilized in a callback file system. For example, the callback file system may provide data as one or more documents and/or as one or more folders in OS 162. In one or more embodiments, the callback file system may control if an application may read and/or modify data of a document. In one or more embodiments, APP 164 may access document 210 via the callback file system.

At 525, an area of a user interface of the application that displays information of the document may be determined. For example, injection process 230 may determine an area of a user interface of the application that displays information of document 210. In one instance, injection process 230 may determine area 330 of user interface 310 that displays information of document 210. In a second instance, injection process 230 may determine area 332 of user interface 350 that displays information of document 210. In another instance, injection process 230 may determine area 334 of user interface 360 that displays information of document 210. In one or more embodiments, the information of the document may include one or more of text, a graphic, a table, and another document, among others. In one or more embodiments, an area of a user interface of print preview of the document may be determined. For example, the user interface of print preview may be or include another user interface.

At 530, watermark information may be determined based at least on the policy information. In one example, injection process 230 may determine one or more strings of respective characters based at least on the policy information. In one instance, the one or more strings of characters may include one or more of "Watermark", "Confidential", "Privileged", "Private", "Secret", and "Top Secret", among others. In a second instance, the one or more strings of characters may include an identification associated with IHS 110. In a third instance, the one or more strings of characters may include an identification associated with a user of APP 164 and/or of IHS 110. In fourth instance, the one or more strings of characters may include an identification associated with a company. In another instance, the one or more strings of characters may include information associated with a copyright and/or ownership information. In another example, injection process 230 may determine graphics based at least on the policy information.

At 535, one or more watermarks may be generated based at least on the watermark information. For example, injection process 230 may generate one or more watermarks based at least on the watermark information. For instance, the one or more watermarks may include one or more strings and/or one or more graphics.

At 540, the one or more watermarks may be displayed on the area of the user interface of the application that displays information of the document. For example, injection process 230 may display the one or more watermarks on the area of the user interface of APP 164 that displays information of document 210. In one instance, injection process 230 may display the one or more watermarks on area 330 of user interface 310 that displays information of document 210. In a second instance, injection process 230 may display the one or more watermarks on area 332 of user interface 350 that displays information of document 210. In another instance, injection process 230 may display the one or more watermarks on area 334 of user interface 360 that displays information of document 210. In one or more embodiments, the one or more watermarks may be displayed on the area of the user interface of print preview of the document.

At 545, it may be determined that the area of the user interface of the application that displays information of the document has been resized. For example, injection process 230 may determine that area 330 of user interface 310 that displays information of document 210 has been resized. In one instance, resizing area 330 may include decreasing a size of area 330. In another instance, resizing area 330 may include increasing a size of area 330.

At 550, a new size of the area of the user interface of the application that displays information of the document may be determined. For example, injection process 230 may determine a new size of area 330 of user interface 310 that displays information of document 210.

At 555, the one or more watermarks, based at least on the new size of the area of the user interface of the application that displays information of the document, may be displayed. For example, injection process 230 may display the one or more watermarks based at least on the new size of area 330 of user interface 310 that displays information of document 210. In one instance, one or more of the one or more watermarks may be resized. In another instance, additional one or more watermarks may be displayed.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   redirect a request to open a document to a background process that controls access to the document;
   retrieve, from the document that is the subject of the request, metadata contained in the document that includes policy information associated with the document and with a user of an application;
   determine, from the metadata retrieved from the document the policy information associated with the document and with the user of the application;
   provide the document to the application;
   determine an area of a user interface of the application that displays information of the document;
   determine watermark information based at least on the policy information;
   generate one or more watermarks based at least on the watermark information; and
   display the one or more watermarks, based at least on the watermark information, on the area of the user interface of the application that displays the information of the document.

2. The information handling system of claim 1, wherein the watermark information includes one or more of an identification associated with the information handling system, an identification associated with the user, an identification associated with a company, and copyright information.

3. The information handling system of claim 1, wherein the instructions further cause the information handling system to:
   determine an area of a user interface of print preview of the document; and
   display at least one of the one or more watermarks, based at least on the watermark information, on the area of the user interface of print preview of the document.

4. The information handling system of claim 1, wherein, to display the one or more watermarks, the instructions further cause the information handling system to display another user interface, at least on the area of the user interface of the application that displays the information of the document, that includes the one or more watermarks, wherein the other user interface is different from the user interface.

5. The information handling system of claim 4, wherein the other user interface includes a window.

6. The information handling system of claim 1, wherein the instructions further cause the information handling system to:
   determine that the area of the user interface of the application that displays the information of the document has been resized;
   determine a new size of the area of the user interface of the application that displays the information of the document; and
   display at least one of the one or more watermarks based at least on the new size of the area of the user interface of the application that displays the information of the document.

7. The information handling system of claim 1, wherein the information of the document includes one or more of text, a graphic, a table, and another document.

8. A method, comprising:
   redirecting a request to open a document to a background process that controls access to the document;
   the background process retrieving, from the document that is the subject of the request, metadata contained in the document that includes policy information associated with the document and with a user of an application;

the background process determining, from the metadata retrieved from the document, the policy information associated with the document and with the user of the application;

the background process providing the document to the application;

determining an area of a user interface of the application that displays information of the document;

determining watermark information based at least on the policy information;

generating one or more watermarks based at least on the watermark information; and displaying the one or more watermarks, based at least on the watermark information, on the area of the user interface of the application that displays the information of the document.

9. The method of claim 8, wherein the watermark information includes one or more of an identification associated with an information handling system, an identification associated with the user, an identification associated with a company, and copyright information.

10. The method of claim 8, further comprising:
determining an area of a user interface of print preview of the document; and
displaying at least one of the one or more watermarks, based at least on the watermark information, on the area of the user interface of print preview of the document.

11. The method of claim 8, wherein the displaying the one or more watermarks includes displaying another user interface, at least on the area of the user interface of the application that displays the information of the document, that includes the one or more watermarks, wherein the other user interface is different from the user interface.

12. The method of claim 11, wherein the other user interface includes a window.

13. The method of claim 8, further comprising:
determining that the area of the user interface of the application that displays the information of the document has been resized;
determining a new size of the area of the user interface of the application that displays the information of the document; and
displaying at least one of the one or more watermarks based at least on the new size of the area of the user interface of the application that displays the information of the document.

14. The method of claim 8, wherein the information of the document includes one or more of text, a graphic, a table, and another document.

15. A computer-readable non-transitory memory medium that includes instructions that, when executed by at least one processor of an information handling system, cause the information handling system to:
redirect a request to open a document to a background process that controls access to the document;
retrieve, from the document that is the subject of the request, metadata contained in the document that includes policy information associated with the document and with a user of an application;
determine, from the metadata retrieved from the document, the policy information associated with the document and with the user of the application;
provide the document to the application;
determine an area of a user interface of the application that displays information of the document;
determine watermark information based at least on the policy information;
generate one or more watermarks based at least on the watermark information; and
display the one or more watermarks, based at least on the watermark information, on the area of the user interface of the application that displays the information of the document.

16. The computer-readable non-transitory memory medium of claim 15, wherein the watermark information includes one or more of an identification associated with the information handling system, an identification associated with the user, an identification associated with a company, and copyright information.

17. The computer-readable non-transitory memory medium of claim 15, wherein the instructions further cause the information handling system to:
determine an area of a user interface of print preview of the document; and
display at least one of the one or more watermarks, based at least on the watermark information, on the area of the user interface of print preview of the document.

18. The computer-readable non-transitory memory medium of claim 15, wherein, to display the one or more watermarks, the instructions further cause the information handling system to display another user interface, at least on the area of the user interface of the application that displays the information of the document, that includes the one or more watermarks, wherein the other user interface is different from the user interface.

19. The computer-readable non-transitory memory medium of claim 18, wherein the other user interface includes a window.

20. The computer-readable non-transitory memory medium of claim 15, wherein the instructions further cause the information handling system to:
determine that the area of the user interface of the application that displays the information of the document has been resized;
determine a new size of the area of the user interface of the application that displays the information of the document; and
display at least one of the one or more watermarks based at least on the new size of the area of the user interface of the application that displays the information of the document.

* * * * *